July 1, 1930.                    S. SVENSON                    1,769,474
           FLOATING WRIST PIN CONSTRUCTION FOR INTERNAL COMBUSTION ENGINES
                              Filed Sept. 30, 1929

Inventor
SVEN SVENSON

By W. F. Woodard
Attorney

Patented July 1, 1930

1,769,474

UNITED STATES PATENT OFFICE

SVEN SVENSON, OF FOND DU LAC, WISCONSIN

FLOATING-WRIST-PIN CONSTRUCTION FOR INTERNAL-COMBUSTION ENGINES

Application filed September 30, 1929. Serial No. 396,363.

The present invention relates to an improved manner of mounting the wrist pin in the piston of the cylinder of an internal combustion engine, whereby, although the wrist pin is free to rotate in both the eye of the connecting rod and its bearings in the piston, it is effectively restrained from movement in the direction of its axis by the provision of simple fastening devices, and so cannot engage the walls of the cylinder and score the latter.

The wrist pin is of tubular formation, and it is maintained in its relatively fixed longitudinal position in the piston, by means of specially formed sheet steel washers, having a central embossment displaced from the plane of the sheet for engaging the tubular wrist pin interiorly at its ends with a tight fit. The concentric margin of the washers, lying in the plane of the sheet and outside of the embossment, is adapted to abut the ends of the wrist pin and the adjacent surfaces of the piston surrounding the bore constituting the bearings in which the wrist pin is entered.

The bottom of the embossment of the said washers is perforated for the passage therethrough of a loop of wire, the loop engaging the washers at both ends of the wrist pin, and being twisted so as to place the wire under tension, and hold the washers in a definite and fixed position with relation to the wrist pin.

By placing the connecting wire under tension, vibration of the straight runs of the latter is avoided, and yet allowance is provided for expansion within the elastic limits of the metal of which the washers and the wire are formed.

Having thus outlined the nature of my invention, I will now specifically describe the same, and in the appended claims will point out the novelty residing in the invention.

Figure 1:
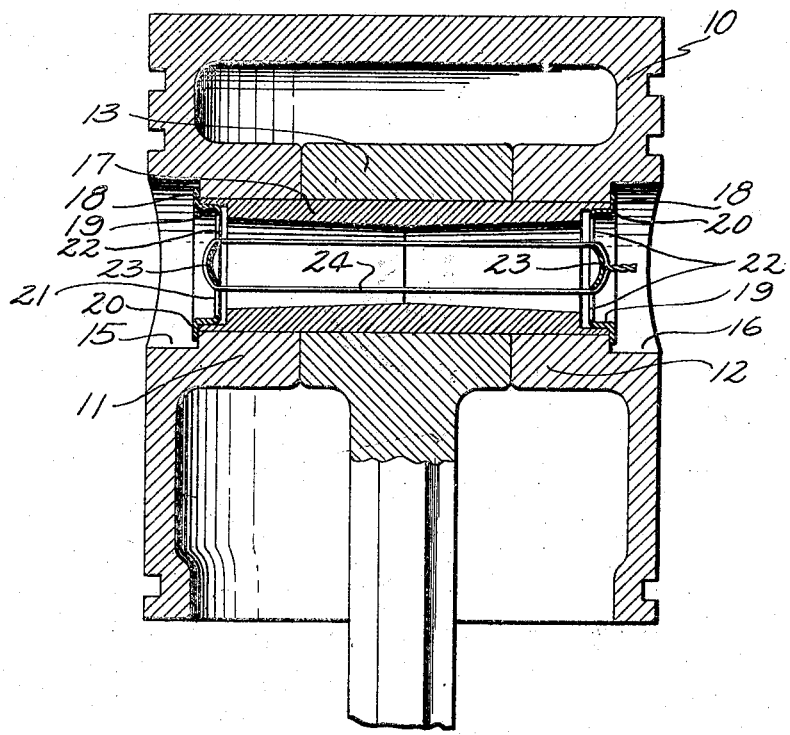
Figure 1 is a vertical central sectional view through a piston, its connecting rod, the floating wrist pin, and the special means employed for securing the wrist pin in a relatively fixed position.

In the drawing, the numeral 10 indicates a piston of usual construction formed with internal aligned bearings 11 and 12 for the ends of the wrist pin, the latter passing through an eye in the upper end of a connecting rod 13. On opposite sides, and in line with the bore forming the bearings for the wrist pin, the piston is counter-bored as at 15 and 16. In the drawing, the counterbores are exaggerated somewhat as to depth over the borings of the actual construction.

A tubular wrist pin 17, having a length approximately equal to the distance between the seats of the bore through the piston, is passed into the bore and through the eye of the connecting rod 13. Although in the drawing I have shown the ends of the wrist pin as counter-bored, this is not a necessary feature of my construction, inasmuch as the tubular wrist pin may be of uniform gauge from end to end, or may be provided with bores tapering from each end, as usual, without counterbores. The wrist pin is free to rotate both in its bearings in the piston and in the eye of the connecting rod.

To secure the floating wrist pin against longitudinal movement, and so prevent its ends from scoring the walls of the cylinder, which sometimes happens when undue length-wise expansion or movement of the wrist pin occurs, I provide a very simple means for securing the wrist pin in a relatively fixed position, and so avoid any tendency to damage the walls of the cylinder. In effecting this result, I stamp from resilient sheet metal steel, special washers 18 of the form shown in Fig. 2, the washers being circular in formation, and provided with a central depression forming an embossment 19, in the form of an offset from the plane of the sheet. The circular wall of the embossment 19 connecting the concentric flange 20 and the bottom 21, is of a diameter to cause it to fit snugly in the end of the wrist pin, it being preferable that the embossments on the washers be sprung into position.

Figure 2:
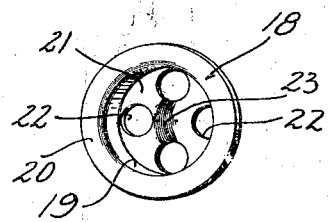
Fig. 2 is a perspective view, looking into the depression of the embossment of one of the specially formed washers.

The bottom 21 of the washer is provided with a plurality of perforations, one of which is indicated by the numeral 22. It is preferable that the perforations be equally spaced as shown in Fig. 2, so that when tension is exerted, there will be an equal distribution of resistance throughout the washer. Between two opposite perforations 22, I form in the bottom of the depression an upstanding transverse rib 23, of rounded cross section, as shown in Fig. 1.

After the wrist pin has been positioned in the eye of the connecting rod 13 and in the bearings 11 and 12 of the piston, I insert the washers as described. The concentric flanges 20 of the washers are brought into close engagement with the ends of the wrist pin, and also bear lightly on the adjacent surfaces at the bottom of the counterbore in the piston surrounding the bore for the bearings. I then loop a suitable wire 24 of selected length, and pass the straight runs of the wire through two of the holes 22 in the washer, one on each side of the rounded rib 23, so that the loop of the said wire will engage the rib in the manner shown at the left of Fig. 1. In the operation of inserting the wire, the free ends of the wire are in like manner passed through two of the holes 22 in the other washer, which are aligned with the two holes of the first washer, and brought together over the rib 23, and twisted, as shown at the right of Fig. 1, so as to place the wire under tension, and secure the washer in a relatively fixed position in the ends of the floating wrist pin.

The construction described possesses an inherent resiliency and flexibility, both in the wire and in the structure of the bottom of the depression or embossment of the washers. In the event that the parts become unduly heated, the elasticity residing in the construction will permit expansion in the desired degree, but the wrist pin cannot move longitudinally to any considerable extent. Consequently, any possible damage to the walls of the cylinder, on account of undue longitudinal movement of the wrist pin, is avoided. The straight runs of the wire are placed under tension in the twisting together of the ends thereof, so that vibration and crystallization of the structure of the wire is avoided.

Having thus described my invention, what I claim and desire to secure by Letters Patent of the United States, is:

1. A piston having aligned transverse bearings for a wrist pin, and a connecting rod, a tubular wrist pin disposed in the said bearings and the eye of the connecting rod and in floating relation both to the bearings and the eye, sheet metal washers provided with depressions or embossments with perforations in the bottom of the said depressions or embossments, the walls of the depressions or embossments engaged inside the ends of the wrist pin with a tight fit, and the concentric margins of the washers abutting the piston in regions surrounding the ends of the bearings therein, and a looped wire passing through perforations in the washers with the ends of the wire twisted to place the wire under tension and fix the washers in the ends of the wrist pin.

2. A piston having aligned transverse bearings for a wrist pin, and a connecting rod, a tubular wrist pin disposed in the said bearings and the eye of the connecting rod and in floating relation both to the bearings and the eye, sheet metal washers provided with depressions or embossments with perforations in the bottom of the said depressions or embossments, the walls of the depressions or embossments engaged inside the ends of the wrist pin with a tight fit, and the concentric margins of the washers abutting the piston in regions surrounding the ends of the bearings therein, a transverse rib formed on the bottom of the embossments, and a looped wire passing through perforations in the washers and about the said transverse ribs, with the ends of the wire twisted to place the wire under tension and fix the washers in the ends of the wrist pin.

In testimony whereof, I have signed my name at Milwaukee, this 8th day of August, 1929.

SVEN SVENSON.